Jan. 24, 1967  O. E. MAYNARD ETAL  3,300,162
RADIAL MODULE SPACE STATION

Filed Jan. 20, 1964  3 Sheets-Sheet 1

*INVENTORS*
OWEN E. MAYNARD
WILLARD M. TAUB
DAVID BROWN
EDWARD H. OLLING
ROBERT M. MASON

BY

*ATTORNEYS*

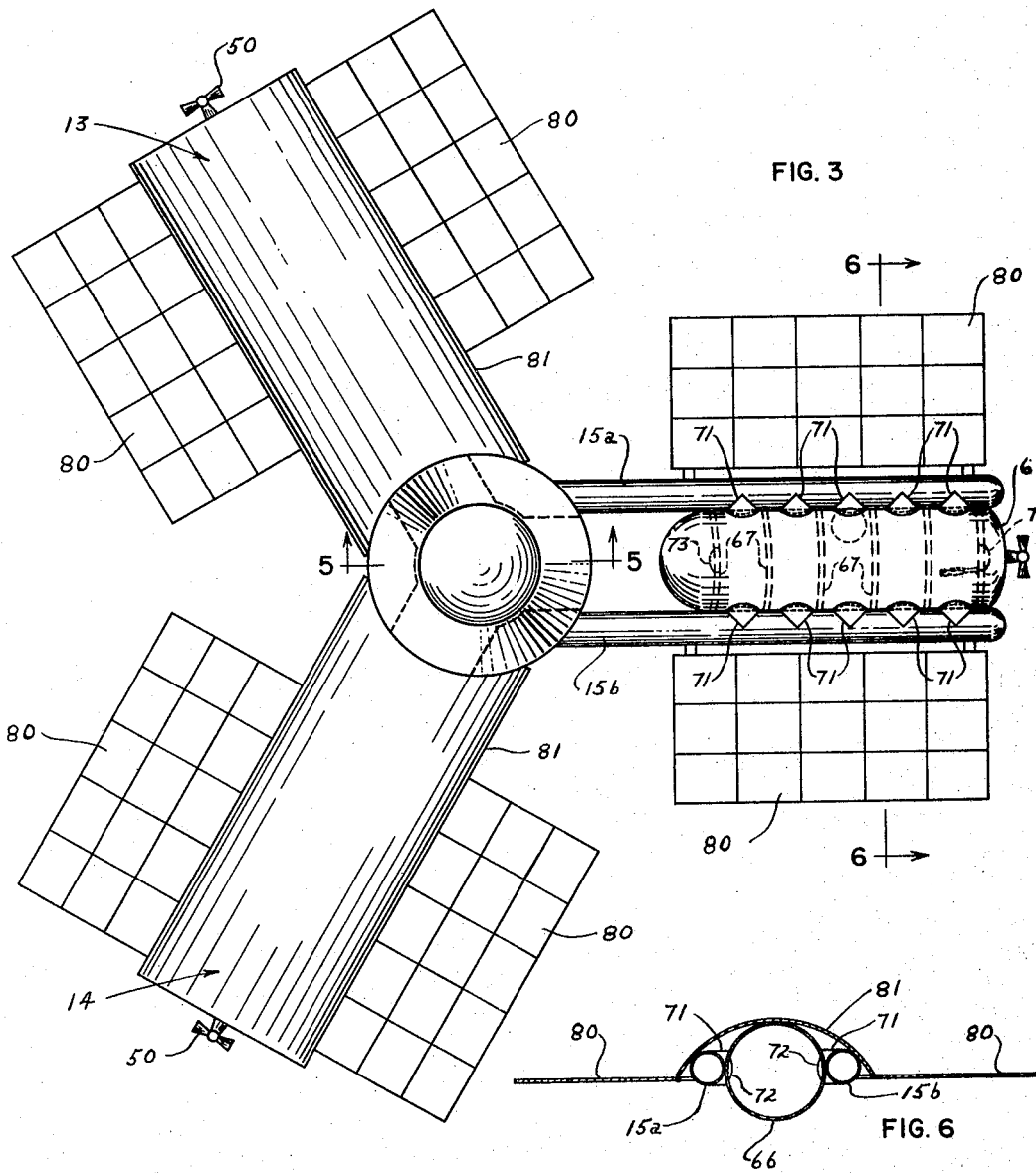

Jan. 24, 1967    O. E. MAYNARD ETAL    3,300,162
RADIAL MODULE SPACE STATION
Filed Jan. 20, 1964    3 Sheets-Sheet 3

*INVENTORS*
OWEN E. MAYNARD
WILLARD M. TAUB
DAVID BROWN
EDWARD H. OLLING
ROBERT M. MASON

BY

*ATTORNEYS*

United States Patent Office 3,300,162
Patented Jan. 24, 1967

3,300,162
RADIAL MODULE SPACE STATION
Owen E. Maynard, Friendswood, Willard M. Taub, Houston, David Brown, La Porte, Edward H. Olling, Seabrook, and Robert M. Mason, Pasadena, Tex., assignors to the United States of America as represented by the Administrator of the National Aeronautics and Space Administration
Filed Jan. 20, 1964, Ser. No. 339,040
11 Claims. (Cl. 244—1)

The invention described herein may be manufactured and used by or for the government of the United States of America for governmental purposes without the payment of any royalties thereon or therefor.

This invention relates generally to structures adapted for use as manned space stations, and more particularly to a manned space station which can be stored in complete assembled form in the payload stage of a multi-stage launch rocket for ejection into an earth orbit and is erectable into an operating configuration which provides a plurality of living compartments with various fractional gravity levels.

A manned space station adapted to serve as a base for a large number and variety of missions to be performed by man in outer space must necessarily include facilities and living quarters for housing a crew for long periods of time, such as a year or more, and must, in addition, include docking and hangar facilities for logistics spacecraft.

Desirably, all equipment for such a station should be in operational status prior to launch and during and after deployment to reduce the complexity and expense in assembling and orbiting an operational station. It should also be of sufficient size to accommodate a zero-gravity laboratory and adequate research facilities for scientific experimentation in the space environment.

Many configurations suitable for use as manned space stations, and many methods and techniques for building and deploying such structures in planetary orbits about the earth have heretofore been proposed. However, due to the limitations in power and size of present day launch vehicles, large manned space stations must necessarily be deployed and erected after ejection into space. A technique previously proposed for placing a large space station in orbit about the earth is that of placing numerous components of the station in orbit and assembling them in space to form the space station. While this technique is feasible, it requires many launch vehicles to orbit the many components and presents a number of additional problems, among which are the complex problems of rendezvous of the numerous components placed in orbit and the actual assembling of these components in space. Another method which has been proposed is to use inflatable structures which may be collapsed to facilitate placing the structure in space and thereafter inflated to form the space station. However, since the inflatable material must be flexible, a structure of this type is difficult to design with sufficient strength to withstand micrometeoroid penetration and provisions for sealing leaks due to such penetrations must be provided. The problem of in-orbit installation of systems and fixed equipment is also intrinsic to this technique.

One type of space station which has also been proposed comprises a number of living compartments arranged in a hexagonal configuration with the compartments hingedly connected to one another. Each living compartment is accessible to a central hub structure about which the space station is rotated to create an artificial gravity. This hexagonal form of space station necessarily comprises many parts which are movable relative to one another during the erection phase and therefore requires a complicated and co-ordinated three-dimensional deployment technique. The number of relatively movable parts also requires an undesirable large number of mechanical seals. In addition, the hexagonal station, by its peripheral arrangement of compartments, provides for only one level of artificial gravity.

The space station of this invention, which has been devised to overcome attendant disadvantages of the prior art, comprises three elongate rigid cylindrical modules, each of which, when the station is fully erected, extends radially from a central hub structure which includes hangar and docking facilities for spacecraft. A docking ring is provided which is extendable and retractable from the hangar to permit spacecraft docking along the axial center line of the station without unduly disturbing stability of the station. The elongate modules which comprise the living compartments and equipment compartments are movable relative to the hub whereby, preparatory to launch, they may be folded into a compact cluster with their cylindrical axes disposed parallel to the hub axis so that the entire space station structure is compatible for mounting on a launch vehicle. After ejection into orbit, the space station structure is deployable from its compact launch configuration into its radial module configuration by suitable actuators which may be operated independently, either by remote control or after boarding of the orbiting structure. When fully deployed, the station is rotated about the hub structure axis to provide stability and produce an artificial gravity in the radial module structures. Since each radial module is divided into several compartments by floors which are rigidly attached in the modules at various distances from the rotation axis of the station, a different level of artificial gravity is produced for each compartment which is directly proportional to the magnitude of the radial distance of the floor of the compartment from the rotation axis. Each floor is curved with a uniform curvature of constant radius about the rotation axis to provide a uniform gravitational force directed perpendicularly to the floor surface. Access from each modular structure to the central hub is provided by access tubes which communicate with each compartment of the module and pivotally attach to and communicate with the hub structure to permit crew members at any location in the modules to have ready access to the hub in the event of an emergency and to facilitate movement of supplies and equipment. Solar cell panels deployable from the modules comprise a typical electrical power generating system of the station with auxiliary power provided by batteries when the solar cells are shaded by the earth from the sun. However, other power generating means, such as a nuclear power plant, might alternatively be employed.

The simple configuration of the station of this invention accommodates a dependable protective structure with few movable parts and only a few mechanical seals and the single mode method for deploying the individual modules whereby each module may be deployed independently and no motion of the parts must coordinate or depend on any other provides a space station structure with an uncomplicated and reliable means of deployment. Furthermore, the provision of a zero-gravity laboratory and the various fractional gravity levels made possible by the location of compartments at different radial distances from the station spin axis provides a space station with greater possibilities for scientific research, particularly as directed to gravitational effects and influences.

Other objects and many of the attendant advantages of this invention will be readily appreciated as the same become better understood by reference to the following detailed description when considered in connection with the accompanying drawings in which like reference numerals designate like parts throughout the figures thereof and wherein:

FIG. 3 is a plan view of the fully deployed space station of FIG. 1 with the shroud covering for one of the radial module structures of the station removed to show the internal structure and arrangement of one of the radial module structures;

FIG. 4 is an end view of the central hub structure of the space station, showing the attachment of the radial structures thereto;

FIG. 5 is a side elevational view through the central hub area of the station as taken along the line 5—5 in FIG. 3 and looking in the direction of the arrows;

FIG. 5a is an enlarged sectional view of the "zero-gravity" laboratory of the station also taken along the line 5—5 in FIG. 3;

FIG. 6 is a sectional view through one of the radial modules of the space station as taken along the line 6—6 in FIG. 3 and looking in the direction of the arrows; and FIG. 7 is a view of the space station with its radial modules folded axially parallel to one another in launch configuration and mounted in the payload stage of a rocket launch vehicle, and showing, in broken lines, one of the radial modules in operational deployed configuration.

Figure 1:
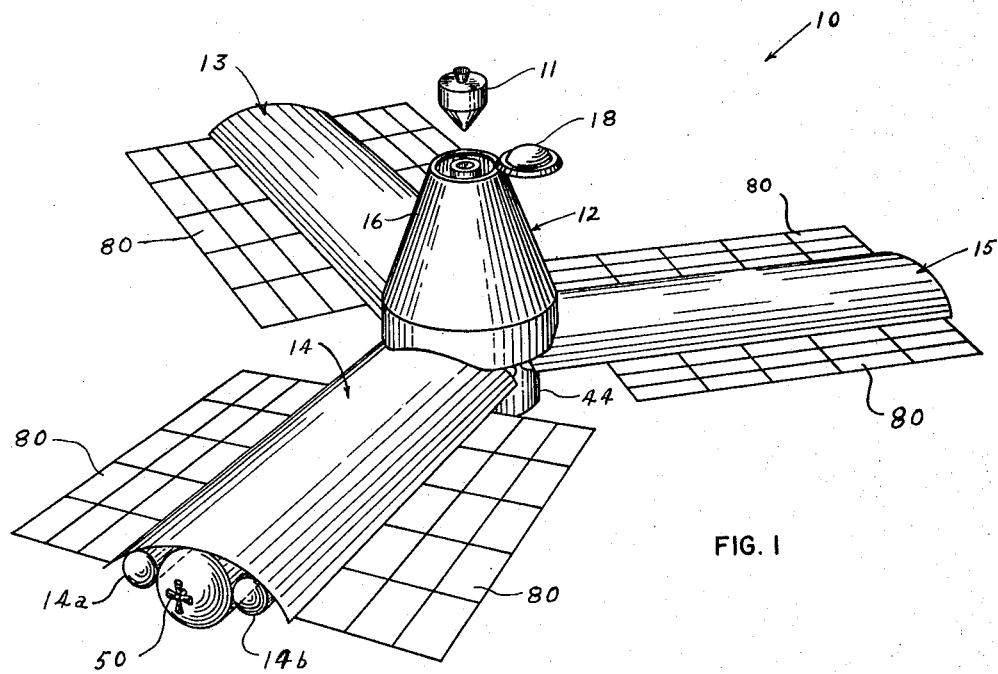
FIG. 1 is a perspective view of a preferred embodiment of the space station of this invention as it would appear in fully erected condition in space and showing a spacecraft in the process of docking to the station.
Figure 2:
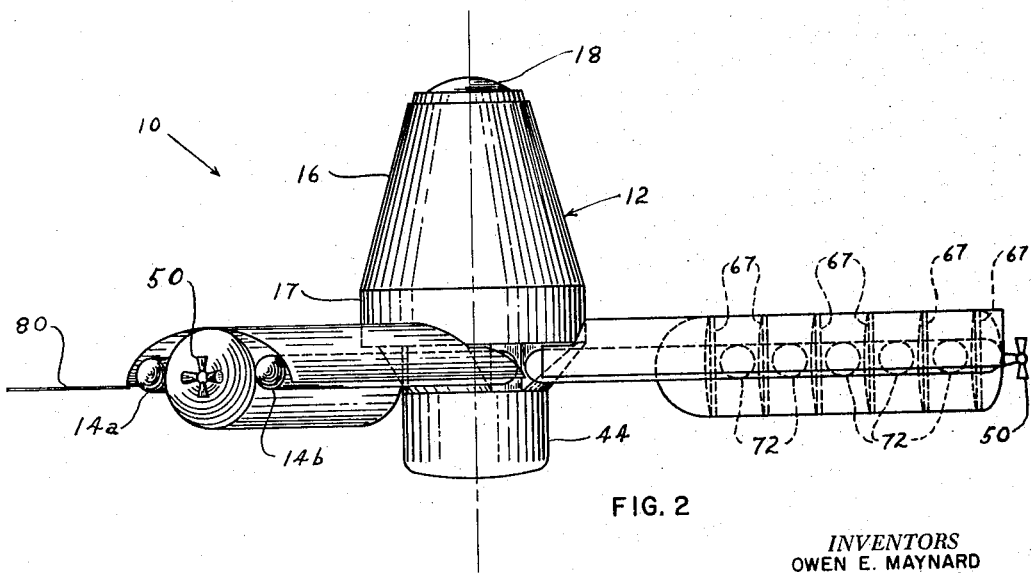
FIG. 2 is a side elevational view of the space station of FIG. 1, with interior structure of the radial modules of the space station shown by broken lines.

Referring more particularly to the drawings, there is shown in FIG. 1 a space station structure 10 which is a preferred embodiment of the invention. The space station is shown as it appears in space when fully erected and deployed in operational configuration with a spacecraft 11 shown in the process of docking to the station. The space station comprises a central hub structure 12, and elongate modular structures 13, 14, and 15, which in the deployed configuration extend radially from the hub structure. The hub structure provides a hangar and docking facilities for spacecraft and a zero-gravity laboratory for scientific experimentation. The elongate modular structures comprise the living compartments and equipment housing compartments of the station. In operation the space station is rotated about the hub structure axis, as shown in FIG. 2, to create an artificial gravity and to spin-stabilize the station.

The hangar which is provided in the hub structure of the station has the external appearance of a truncated cone section 16 which is superposed on a cylindrical section 17 of circular cross-section and capped by a dome-shaped hatch 18 which covers the entrance to the hangar. When opened, the entrance is of sufficient size to admit the entry of spacecraft into the hangar. The hatch 18 is a pressure tight closure which is mounted by a pivot connection 19, as shown in FIG. 5, for movement in a direction perpendicular to the hub axis. The docking mechanism for receiving spacecraft comprises a docking fixture 21 which is adaptable to mate with the spacecraft. For a spacecraft of the type shown in the fixture is in the form of a docking ring which is extensible through the hangar opening when the hangar hatch is swung open to thus provide a clear target for the spacecraft pilot. The docking ring is mounted on guide rails 23 which extend in an axial direction in the hangar and is movable thereon by suitable motive means (not shown). The extensible ring is adapted to take impact loads, lock on to the spacecraft by suitable latch devices (not shown) and then in retracting pull the spacecraft into the hangar. It is also located near the center of rotation of the station in order to provide a target which does not require extensive maneuvering of the spacecraft and to minimize disturbing the stability of the station after docking. Docking could be accomplished by using a rolling maneuver of the spacecraft to match the angular rotation of the station. Once inside the hangar, cargo, transfer, maintenance, and launch preparation would take place in a protected and environmentally controlled area although operations in and out of the hangar would normally be accomplished by pumping the hangar down to save the environmental gases.

As shown in FIG. 5, the spacecraft 11 are supported in the hangar on docking fixtures, such as the annular supports 26 and 25, and supports 28 and 29, which are symmetrically located with respect to the rotation axis of the station. A suitable storage mechanism (not shown) may be used to move the spacecraft to their various storage positions in the hangar.

Directly below the hangar is an access chamber 31, as best shown in FIG. 5, through which ingress and egress to and from the modular structures is accomplished. The access chamber is separated from the hangar by a pressure bulkhead 32 and an airlock 33 provided with pressure-type doors 34 and 35, located along the axial center line of the hub structure to permit passage between the hangar and the access chamber. The airlock permits maintenance of pressure in the access chamber when the hangar hatch is open and the hangar is exposed to the space vacuum.

In its external configuration the access chamber structure is provided with recesses 41, 42, and 43 for accommodating the pivotal attachment of each of the elongate radial structures 13, 14, and 15 to the access chamber. The recesses, which are equiangularly spaced about the hub axis, are each defined in the outer surface of the chamber structure by a pair of straight walls which extend inwardly from the outermost surface of the chamber in intersecting planes disposed in parallel relationship to the hub axis. As shown in FIG. 4, the elongate structure 13 is attached to the hub structure by a pair of parallel disposed cylindrical access tubes 13a and 13b, to be hereinafter described, and which lead to the living compartments and equipment storage compartments of each elongate radial structure. The access tubes are pivotally attached to the parallel walls 41a and 42a of the recesses 41 and 42 for pivotal movement of the elongate structure in a plane through the hub axis. Similarly, the elongate structure 14 is pivotally attached to the hub by the pair of access tubes 14a, 14b which joint the walls 42b, 43a of the recesses 42 and 43 and the elongate structure 15 is pivotally attached by the access tubes 15a, 15b which join the walls 43b and 41b of the recesses 43 and 41, respectively.

Directly below the access chamber of the hub structure and integrally joined thereto is a cylindrical shell 44 of circular cross-section which houses a "zero-gravity" laboratory. The laboratory is in the form of a pair of cylindrically shaped chambers 45 and 46 which are axially disposed relative to one another and journalled for rotation on bearing rings 45a, 46a mounted on a transverse partition 47 which extends across the cylindrical housing shell and is rigidly attached to the inner wall of the shell. When the space station is rotated by spin rockets 50 located outboard of the radial modules, as shown in FIG. 1, for the purpose of producing an artificial gravity for the station, the zero-G laboratory is motor-driven in a direction opposite to that of the space station at a speed that maintains a relative rotational speed of zero and consequently a substantially zero-gravity environment in the laboratory. The driving motor 51 for the laboratory is mounted on the partition 47 and is provided with dual driving gears 52, 53 which co-act with gear rings 54 and 55 affixed respectively to the laboratory chambers 45 and 46. As shown in FIG. 5, the gear ring 54 is disposed externally and circumferentially about the chamber 45 adjacent the partition 47 and gear ring 55 is mounted externally and circumferentially about the chamber 46 adjacent partition 47 for cooperation with the gear 53. Access between the two laboratory chambers is possible through an opening 60 provided in the partition 47 and the chamber walls adjacent thereto and which is made along the axial center line of the structure. A similar axial opening 61 is provided through the wall of the access chamber 31 and the adjacent wall of the laboratory chamber 45.

The elongate modular structures 13, 14, and 15, in which are located the crew living quarters and the equipment housing and storage compartments for the station, are each comprised of a cylindrical pressure vessel or module 66 of circular cross-section which is provided with several pressure-tight transverse partitions 67 which divide the cylinder into a number of compartments. All compartments are individually pressurized for the purpose of permitting individual seal-off of compartments in emergencies and fixed equipment is mounted away from the pressure walls to expose the walls for locating and repairing of leaks when necessary. It is to be noted that when the station is rotated each partition forms the deck of one compartment and the ceiling of the next. Since each partition is at a different radial distance from the rotation axis of the station, each deck has a gravity level which is directly proportional to its radial distance from the rotation axis. The partitions are curved with a uniform constant radius about the axis of rotation so that the crew members may stand upright anywhere on the deck without lateral forces acting on them.

Access to the hub structure from the compartments is made possible by the pair of access tubes which are disposed along opposite sides of the cylindrical module in each radial structure and attach to the central hub as described above. Each tube extends the length of the cylindrical module and is in communication with the several compartments in the cylinder by means of lateral outlet tubes 71 with pressure-tight doors 72, although access to the compartments at the extremities of the cylinder is by means of pressure-tight doors 73 through the deck of the next adjacent compartment. At their points of attachment to the hub the access tubes are provided with pressure-tight doors 74 to permit passage between the hub and the tubes. In addition to providing ready access to the hub area, the access tubes provide structural support for the decks when under an unbalanced pressure load. A conveyer system might be provided in one of the tubes to convey equipment from the hub to any one of the compartments and a continuous ladder means in the other. Provision is also made for pressurizing the access tubes independently of the various compartments.

The spin rockets 50 for rotating the station about its hub axis and the propulsion rockets for controlling the attitude of the station and maintaining a circular orbit are located at the radial extremities of the cylindrical modules.

Electrical power for the space station is supplied typically by a solar cell power generating system wherein each module is provided with two solar cell arrays 80 which are attached along the access tubes of each module and are deployed for operation after orbit is attained by means of conventional actuators (not shown). The multiple panels of each array may be hinged edge to edge whereby the cells are foldable into a compact package in the stowed position. In the launch configuration, the solar cells are held in retracted position against the access tubes. During the orbit period when the solar cells are not exposed to the sun, auxiliary power may be obtained from batteries, or the like. The solar cell arrays are deliberately oversized to account for anticipated degradation of the cells due to radiation and meteoroid damage, as well as to provide additional energy for recharging the batteries during periods when the space station is exposed to the sun. By means of the attitude control rockets, the station would generally be oriented to point its axis of rotation in the direction of the sun so as to best utilize the solar cell arrays when deployed outboard of the radial modules.

The space station is shown in FIG. 7 in its launch configuration with the elongate radial modules folded into a compact cluster with their longitudinal axes parallel to the hub axis and the longitudinal axis of the launch rocket. Each modular structure is provided with a covering shroud 81 which is cylindrical in shape and in cross-section describes an arc of 120 degrees. When mounted on an adapter section 82 atop the launch rocket 83, the shrouds fully enclose the modular structures. A conical nose fairing 84 may be provided atop the hub structure to improve aerodynamic characteristics during the launch phase. A small booster rocket 87, which is shown in dashed lines in FIG. 7, is attached to the ends of the three radial modules and located therebetween when the modular structures are folded thereabout. Conventional attaching means (not shown) which will permit subsequent separation of the small rocket from the space station structure are employed. The booster rocket provides means for placing the space station in a more desirable orbit after an initial orbit is attained. Assuming no malfunctions during launch, the space station retains the configuration shown in FIG. 7 until orbit is attained. Thereafter the launch vehicle is jettisoned from the space station in conventional manner, as by the use of pyrotechnics or the like, and the conical nose fairing is also jettisoned at this time. The space station may then be deployed from its compact launch configuration into its radial module configuration by simple linear separation devices which may be electrically driven actuators, pneumatic or hydraulic power cylinders, or a simple manually operated reel system 91 as shown in FIG. 5 wherein the reel cable extends through a suitable seal and bearing in the hangar wall. Consequently, depending on the nature of the actuators provided, energization of the actuators may be accomplished by a remote radio signal, or they may be energized after the station is boarded by a boarding party. In any event, the actuation mechanism for each module is independent of the actuators for the other two modules so that deployment need not occur in synchronous phase. When in the deployed configuration, the radial modules are disposed equiangularly about the central hub structure of the station with their longitudinal axes disposed coplanar. They may then be permanently welded to the hub structure or otherwise attached thereto by suitable latching devices.

A space station which has been designed in accordance with this invention comprises an over-all diameter of one-hundred-fifty (150) feet with an internal diameter for the cylindrical tanks in the radial modules of approximately fifteen (15) feet. The distance from floor to floor in the module compartments is approximately seven (7) feet and a five (5) foot diameter is employed for the access tubes. The diameter of the space station structure in collapsed form with its radial modules folded together, is approximately thirty-three (33) feet which corresponds to the maximum diameter of the hub structure and of the launch vehicle. The space station structure is provided with environmental control systems which would provide an atmosphere of suitable constituents, which controlled pressure, temperature, and humidity. Sufficient oxygen and nitrogen are carried to permit several complete repressurizations of the entire space station. The wall structure of the space station is sufficient to protect against meteoroid penetration and radiation and might comprise a variety of structures such as, for example, multilayer or sandwich types. The size of the station and the equipment provided would be capable of accommodating a nominal crew of six (6) to twenty-four (24) people.

A speed of rotation for the space station of approximately three (3) r.p.m. is considered suitable for a space station with a radial module extremity of approximately seventy-five (75) feet radius. This speed of rotation creates an artificial gravity of approximately .25 G at the radial extremities which is selected to compensate for gravity variations due to Coriolis forces and the occurrence of ear canal sickness due to such forces. On the basis of anticipated rotational effects on the station occupants, the primary living quarters and working areas for crew members are preferably located in the compartments near the maximum rotational radius whereas the areas with lesser rotational radii are reserved for equipment bays and storage areas which will not require long term habitation by the crew members. It is a characteristic of this station that the "up" direction is towards the axis of rotation and that a person's head being closer to the center of rotation would experience less gravitational acceleration than his feet.

It is therefore seen that the space station of this invention is a collapsible structure which is suitable for mounting atop a launch vehicle for ejection into space. The deployment of the structure into its operating configuration involves only a few relatively movable parts, without the need for synchronized and coordinated motion between the parts. Since it requires only a few relatively movable parts it also requires only a few mechanical seals as in the pivot connections between the access tubes and the hub and for the hangar hatch. In addition, a particularly important feature of this space station is that gravitational force acts in the same direction relative to the compartment floors when the structure is in its launch configuration on the launch pad as when in orbit. This therefore makes it possible to check out all systems and render them operational while still on the launch pad and thus eliminates problems and risks involved in placing them in operation after orbit. Furthermore, fractional gravity levels in its various compartments and the zero-gravity laboratory provide effective testing grounds for materials, finishes, processes, and equipment in space. The various gravity levels also make possible a wide range of scientific research activities, such as those directed to determining man's physiological limitations and capabilities for sustaining long durations in an operational space environment and scientific investigations of biological, hereditary, and genetic factors related to man, animals, and plants.

It is also to be noted that considerable variation may be made in the particular space station structure of this invention without departure from the scope of the invention. For instance, although the hub structure is shown to be canister-shaped, the particular configuration is arbitrary so long as it is compatible with the launching rocket. Similarly, although dual access tubes for each of the radial structures are provided, a single access tube could be used. The provision of dual tubes, however, while increasing the possibility of pressure leaks, permits an increase in structural rigidity and allows an alternate access tube. Furthermore, while other cross-sections might be used, the circular cross-section of the cylindrical pressure vessels, as disclosed, provides a low surface area to cross-sectional area ratio and has structural compatability as a pressurized vessel while affording sufficient volume to perform the necessary functions. While the structure has been described as comprising three radial modules, considered optimum, a greater number might be provided, and, under special conditions, two might be sufficient. Also, if desired, a propulsion unit might be attached externally to the zero-G laboratory along the station axis to provide greater propulsion means for maneuvering the station.

It should be understood, of course, that the foregoing disclosure relates only to preferred embodiments of the invention and that it is intended to cover all changes and modifications of the examples in the invention herein chosen for the purposes of the disclosure which do not constitute departure from the spirit and scope of the invention.

What is claimed and desired to be secured by Letters Patent is:

1. A space station structure adaptable to being disposed as the payload of a launch vehicle and launched into a near earth orbit for use as a manned space station, said space station comprising:

a central hub structure including hangar means of a size and configuration suitable for receiving and storing spacecraft therein;

a plurality of elongate modular structures, each said modular structure being divided into compartments including living compartments;

means for pivotally attaching said elongate modular structures to said hub structure whereby the elongate modular structures are movable with a single degree of freedom between a first position wherein the modular structures are disposed compactly in an axially parallel position and in parallel relationship with the hub axis and a second position wherein said modular structures extend radially from the hub structure with their longitudinal axes disposed substantially coplanar;

means for moving the modular structures from said first axially parallel position to said second position wherein the modular structures extend radially from the hub structure;

access means communicating each compartment of said modular structures with said hub structure whereby personnel may move from the compartments of the modular structures into said hub structure; and rotation means for spinning said space station structure about a central axis through said hub structure to provide an artifical gravity by its rotation.

2. A space station structure adaptable to being disposed as the payload of a launch vehicle and launched into extraplanetary space for use as a manned space station as recited in claim 1 and wherein said hub structure includes a separate laboratory compartment and means for spinning the laboratory compartment relative to the remainder of said space station structure to maintain substantially zero-gravity conditions in said laboratory when the space station structure is rotated by said rotation means.

3. A space station structure adaptable to being disposed as the payload of a launch rocket and launched into extraplanetary space for use as a manned space station, said space station comprising:

a central hub structure including hangar means of a size and configuration suitable for receiving and storing spacecraft therein;

a plurality of elongate modular structures, each said modular structure being divided into compartments including living compartments;

means for pivotally attaching said elongate modular structures to said hub structure whereby the elongate modular structures are movable with a single degree of freedom between a first position wherein the modular structures are disposed compactly in an axially parallel position and in parallel relationship with the hub axis and a second position wherein said modular structures extend radially from the hub structure with their longitudinal axes disposed coplanar;

means for moving the modular structures from said first axially parallel position to said second position wherein the modular structures extend radially from the hub structure; and access means communicating said modular structures with said hub structure whereby personnel may move from the compartments of the modular structures into said hub structure.

4. A space station structure adaptable to being disposed as the payload of a launch vehicle and launched into extraplanetary space for use as a manned space station, said space station comprising:

a central hub structure including hangar means of a size and configuration suitable for receiving and storing spacecraft therein;

a plurality of modular structures, each in the form of an elongate cylindrical pressure vessel having a plurality of transverse partitions rigidly connected to the inner wall of the pressure vessel and dividing the pressure vessel into a number of cylindrical compartments adaptable to individual pressurization for use as living compartments;

means pivotally connecting said elongate modular structures to said hub structure whereby the elongate modular structures are movable between a first position wherein the modular structures are disposed compactly in axially parallel relationship with one another and with the hub axis and a second position wherein said elongate modular structures extend radially from said hub structure with their longitudinal axes disposed substantially coplanar;

means for moving the modular structures from said first position wherein the space station structure is suitable for mounting as the payload stage of a launch vehicle to said second position whereby the modular structures may be deployed with their cylindrical axes extending radially from the hub structure when orbit is attained;

access means communicating each compartment of said modular structures with said hub structure whereby personnel may move between the compartments of the modular structures and said hub structure; and means for spinning said space station structure about a central axis through said hub structure to provide an artificial gravity.

5. A space station structure adaptable to being disposed as the payload of a launch vehicle and launched into extraplanetary space for use as a manned space station, said space station comprising:

a central hub structure including hangar means of a size and configuration suitable for receiving and storing spacecraft therein;

a plurality of modular structures, each in the form of an elongate cylindrical pressure vessel having a plurality of transverse partitions rigidly connected to the inner wall of the vessel and dividing the vessel into a number of cylindrical compartments adaptable to individual pressurization for use as living compartments;

means providing access between the radial module compartments and the hub structure, said access means comprising a pair of cylindrical access tubes disposed along the length of the cylindrical vessel of each module at the sides thereof and communicating with the hanger means of the hub structure and each compartment of the cylindrical vessel by means of pressure tight doors whereby personnel may move freely between the compartments of the modular structures and the hub structure;

means for pivotally connecting each access tube with said hub structure whereby the elongate modular structures are movable between a first position wherein the modular structures are disposed compactly in axially parallel relationship with the hub axis and a second position wherein the modular structures extend radially from the hub structure with their longitudinal axes disposed substantially coplanar;

means for moving the modular structures from said first position wherein the space station structure is suitable for mounting as the payload stage of a launch rocket to said second position whereby the modular structures may be deployed with their cylindrical axes extending radially from the hub structure when orbit is attained after launch; and means for spinning said space station structure about a central axis through said hub structure to provide an artificial gravity.

6. A space station structure adaptable to being disposed as the payload of a launch rocket and launched into extraplanetary space for use as a manned space station, said space station comprising:

a central hub structure including hangar means of a size and configuration suitable for receiving and storing spacecraft therein;

a plurality of elongate modular structures, each in the form of a cylindrical pressure vessel having a plurality of transverse partitions rigidly connected to the inner wall of the vessel and dividing the vessel into a number of cylindrical compartments adaptable to individual pressurization for use as living compartments, said transverse partitions each having a uniform curvature providing a cylindrical deck surface which is equiradially distant from the hub axis;

means pivotally connecting said elongate modular structures to said hub structure whereby the elongate modular structures are movable between a first position wherein the modular structures are disposed compactly in an axially parallel position with the hub axis and a second position wherein said modular structures extend radially from said hub structure with their longitudinal axes disposed substantially coplanar;

means for moving the modular structures from said first position wherein the space station structure is suitable for mounting as the payload stage of a launch rocket to said second position whereby the modular structures may be deployed with their cylindrical axes extending radially from the hub structure when orbit is attained;

access means communicating each compartment of said modular structures with said hub structure whereby personnel may move between the compartments of the modular structures and said hub structure; and means for spinning said space station structure about a central axis through said hub structure to provide an artificial gravity for each radial module compartment of a magnitude directly proportional to the radial distance of the compartment deck from the rotation axis.

7. A space station structure adaptable to being disposed as the payload of a launch rocket and launched into extraplanetary space for use as a manned space station, said space station comprising:

a central hub structure;

a plurality of elongate modular structures, each in the form of a cylindrical pressure vessel having a plurality of transverse partitions rigidly connected to the inner wall of the vessel and dividing the vessel into a number of cylindrical compartments adaptable to individual pressurization for use as living compartments, each said transverse partition being of uniformly constant radial distance from the hub axis;

means pivotally connecting said elongate modular structure to said hub structure whereby the elongate modular structures are movable between a first position wherein the modular structures are disposed compactly in an axially parallel position with the hub axis and a second position wherein said modular structures extend radially from said hub structure with their longitudinal axes disposed substantially coplanar;

means for moving the modular structures from said first position wherein the space station structure is suitable for mounting as the payload stage of a launch rocket to said second position whereby the modular structures may be deployed with their cylindrical axes extending radially from the hub structure when orbit is attained;

access means communicating each compartment of said modular structures with said hub structure whereby personnel may move between the compartments of the modular structures and said hub structure, said hub structure including a laboratory compartment and hanger means of a size and configuration for receiving and storing spacecraft;

means for spinning said space station structure about a central axis through said hub structure to provide an artificial gravity for each radial module compartment of a magnitude directly proportional to the radial distance of the compartment deck from the rotation axis; and means for spinning the laboratory compartment relative to the remainder of said space station structure to maintain substantially zero-gravity conditions in said laboratory when the space station structure is rotated by said rotation means.

8. A space station structure adaptable to being disposed as the payload of a lauch rocket and launched into a near-earth orbit for use as a manned space station, said space station comprising:

a central hub structure;

a plurality of elongate modular structures, each said modular structure being divided into compartments including living compartments;

means for pivotally attaching said elongate modular structures to said hub structure whereby the elongate modular structures are movable with a single degree of freedom between a first position wherein the modular structures are disposed compactly in an axially parallel position and in parallel relationship with the hub axis, and a second position wherein said modular structures extend radially from the hub structure with their longitudinal axes disposed coplanar;

means for moving the modular structures from said first axially parallel position to said second position wherein the modular structures extend radially from the hub structure; and access means communicating said modular structures with said hub structure whereby personnel may move from the compartments of the modular structures into said hub structure.

9. A space station structure adaptable to being disposed as the payload of a launch rocket and launched into a near-earth orbit for use as a manned space station, said space station comprising:

a central hub structure;

a plurality of elongate modular structures, each in the form of a cylindrical pressure vessel having a plurality of transverse partitions rigidly connected to the inner wall of the vessel and dividing the vessel into a number of cylindrical compartments adaptable to individual pressurization for use as living compartments, said transverse partitions each having a uniform curvature providing a cylindrical deck surface which is equiradially distant from the hub axis;

means pivotally connecting said elongate modular structures to said hub structure whereby the elongate modular structures are movable between a first position wherein the modular structures are disposed compactly in an axially parallel position with the hub axis and a second position wherein said modular structures extend radially from said hub structure with their longitudinal axes disposed substantially coplanar;

access means communicating each compartment of said modular structures with said hub structure whereby personnel may move between the compartments of the modular structures and said hub structure; and means for spinning said space station structure about a central axis through said hub structure to provide an artificial gravity for each radial module compartment of a magnitude directly proportional to the radial distance of the compartment deck from the rotation axis.

10. A space station structure adaptable to being disposed as the payload of a launch rocket and launched into a near-earth orbit for use as a manned space station, said space station comprising:

a central hub structure;

a plurality of elongate modular structures, each in the form of a cylindrical pressure vessel having a plurality of transverse partitions rigidly connected to the inner wall of the vessel and dividing the vessel into a number of cylindrical compartments adaptable to individual pressurization for use as living compartments, said transverse partitions each having a uniform curvature providing a cylindrical deck surface which is equiradially distant from the hub axis;

access means communicating each compartment of said modular structures with said hub structure whereby personnel may move between the compartments of the modular structures and said hub structure; and means for spinning said space station structure about a central axis through said hub structure to provide an artificial gravity for each radial module compartment of a magnitude directly proportional to the radial distance of the compartment deck from the rotation axis.

11. A space station structure adaptable to being disposed as the payload of a launch rocket and launched into a near-earth orbit for use as a manned space station, said space station comprising:

a central hub structure;

a plurality of elongate modular structures, each in the form of a cylindrical pressure vessel having a plurality of transverse partitions rigidly connected to the inner wall of the vessel and dividing the vessel into a number of cylindrical compartments adaptable to individual pressurization for use as living compartments, said transverse partitions each having a uniform curvature providing a cylindrical deck surface which is equiradially distant from the hub axis; and access means communicating each compartment of said modular structures with said hub structure whereby personnel may move between the compartments of the modular structures and said hub structure.

References Cited by the Examiner

UNITED STATES PATENTS 3,169,725   2/1965   Berglund _____ 244—1

OTHER REFERENCES

Aviation Week and Space Tech., 7–22–63, pages 77–82.

FERGUS S. MIDDLETON, *Primary Examiner.*